US012759103B2

(12) United States Patent
Chen et al.

(10) Patent No.: US 12,759,103 B2
(45) Date of Patent: Oct. 13, 2026

(54) BEVELED SWING HEAD INTERPOLATION TOOL CHANGING MECHANISM AND METHOD THEREOF

(71) Applicant: KEDE NUMERICAL CONTROL CO., LTD., Dalian (CN)

(72) Inventors: Hu Chen, Dalian (CN); Lianyang Wang, Dalian (CN); Xin Deng, Dalian (CN); Cuijuan Guo, Dalian (CN); Yufeng Chen, Dalian (CN); Xingjian He, Dalian (CN); Zidan Ju, Dalian (CN); Shaoyi Liu, Dalian (CN); Qidong Guo, Dalian (CN); Dechuan Liu, Dalian (CN); Lujun Gao, Dalian (CN)

(73) Assignee: KEDE NUMERICAL CONTROL CO., LTD., Dalian (CN)

( * ) Notice: Subject to any disclaimer, the term of this patent is extended or adjusted under 35 U.S.C. 154(b) by 489 days.

(21) Appl. No.: 17/796,969

(22) PCT Filed: Sep. 22, 2020

(86) PCT No.: PCT/CN2020/116912
§ 371 (c)(1),
(2) Date: Aug. 2, 2022

(87) PCT Pub. No.: WO2021/155664
PCT Pub. Date: Aug. 12, 2021

(65) Prior Publication Data

US 2023/0053951 A1 Feb. 23, 2023

(30) Foreign Application Priority Data

Feb. 4, 2020 (CN) ........................ 202010079843.0

(51) Int. Cl.
*B23Q 3/157* (2006.01)
*B23Q 1/62* (2006.01)
*B23Q 3/155* (2006.01)

(52) U.S. Cl.
CPC .......... *B23Q 3/15722* (2016.11); *B23Q 1/626* (2013.01); *B23Q 3/15539* (2016.11);
(Continued)

(58) Field of Classification Search
CPC ............ B23Q 3/15539; B23Q 3/15706; B23Q 3/15722; B23Q 3/15726; B23Q 3/15733;
(Continued)

(56) References Cited

U.S. PATENT DOCUMENTS 3,526,033 A * 9/1970 Saunders ........... B23Q 3/15706 483/54
3,930,301 A * 1/1976 Wagner .................. B23Q 3/157 483/54

(Continued)

FOREIGN PATENT DOCUMENTS

CN 1695895 A 11/2005
CN 106994615 A 8/2017

(Continued)

*Primary Examiner* — Sunil K Singh
*Assistant Examiner* — Michael Vitale
(74) *Attorney, Agent, or Firm* — Muncy, Geissler, Olds & Lowe, P.C.

(57) ABSTRACT

The present invention discloses a bevel swing head interpolation tool changing mechanism, which includes a bed, a sliding table, a column, a ram, a swing head and a tool magazine, in which the swing head moves along the X-axis, Y-axis and Z-axis of the machine tool, the axis of the swing head and a B-axis form an included angle between 30°-60°, the tool magazine is equipped with a tool, and the swing head moves along its own axis direction and change the tool. The invention provides a bevel swing head interpolation tool changing mechanism and a method thereof, capable of quick (Continued)

and convenient tool changing through the mutual cooperation of the movement of the linear axes of the machine tool, without complex equipment such as manipulators used, and which is simple in structure, good in stability and easy to maintain.

7 Claims, 9 Drawing Sheets

(52) U.S. Cl.
CPC ..... *B23Q 3/15706* (2013.01); *B23Q 3/15733* (2013.01); *Y10T 483/10* (2015.01); *Y10T 483/1795* (2015.01); *Y10T 483/1809* (2015.01); *Y10T 483/1882* (2015.01)

(58) Field of Classification Search
CPC .. B23Q 3/15753; B23Q 3/1576; B23Q 1/626; Y10T 483/1736; Y10T 483/179; Y10T 483/1793; Y10T 483/1795; Y10T 483/1798; Y10T 483/1809; Y10T 483/1873; Y10T 483/1882; Y10T 483/1891
USPC ........ 183/31, 54, 55, 56, 57, 59, 66, 67, 68; 483/31, 54, 55, 56, 57, 59, 66, 67, 68
See application file for complete search history.

(56) References Cited

U.S. PATENT DOCUMENTS 5,205,806 A * 4/1993 Ishida .................. B23Q 16/028 483/18
5,300,006 A * 4/1994 Tanaka ............... B23Q 3/15706 483/67
5,533,846 A * 7/1996 Geissler ................... B23Q 1/54 409/211
6,126,526 A * 10/2000 Herrscher ............... B24B 55/02 483/33
8,241,191 B2 * 8/2012 Okabe ................ B23Q 3/15724 483/68
8,887,361 B2 * 11/2014 Yu ............................ B23Q 5/40 82/122
8,950,987 B2 * 2/2015 Okada ..................... B23B 35/00 409/211
9,434,007 B2 * 9/2016 Yamamoto ............ B23B 27/007
9,505,060 B2 * 11/2016 Jung ........................ B23Q 1/26
9,694,378 B2 * 7/2017 Reichler ............... F16L 37/248
2002/0050508 A1 * 5/2002 Yoshinaga ........... B23Q 1/5431 228/2.1
2008/0207417 A1 * 8/2008 Braun ................ B23Q 3/15706 483/55
2008/0213057 A1 * 9/2008 Betschon .................. B23C 3/18 409/165
2011/0200406 A1 * 8/2011 Lang ...................... B23Q 7/047 409/137

FOREIGN PATENT DOCUMENTS

CN 107470959 A 12/2017
CN 108500703 A 9/2018
CN 111203742 A 5/2020
DE 202013000225 U1 * 4/2014 ......... B23Q 3/15706
EP 1285725 A2 2/2003
EP 2295199 A1 * 3/2011 ............. B23Q 1/012
JP 62181849 A * 8/1987
WO WO-2019207003 A1 * 10/2019 ............. B23Q 1/015

* cited by examiner

BEVELED SWING HEAD INTERPOLATION TOOL CHANGING MECHANISM AND METHOD THEREOF

TECHNICAL FIELD

The invention relates to the field of tool changing of machine tools, in particular to a bevel swing head interpolation tool changing mechanism and method thereof.

BACKGROUND ART

In fine machining such as blisk machining, in order to machine the shape of a blade, the tool of the blisk machining center and the workpiece to be machined require a certain degree of rotation, and this rotation is completed by the relative movement of the workpiece and the tool in multiple dimensions.

For better machining of the blisk, the swing head where the tool is mounted and the linear axis of the machine tool have a certain angle therebetween, and therefore a tool changing mechanism and a method to facilitate the swing head to change the tool are needed.

SUMMARY OF INVENTION

The present invention provides a bevel swing head interpolation tool changing mechanism and a method thereof, capable of quick and convenient tool changing and which is simple in structure, good in stability and easy to maintain.

A bevel swing head interpolation tool changing mechanism, which includes a bed, a sliding table, a column, a ram, a swing head and a tool magazine, in which the swing head moves along the X-axis, Y-axis and Z-axis of the machine tool, the axis of the swing head and a B-axis form an included angle between 30°-60°, the tool magazine is equipped with a tool, and the swing head moves along its own axis direction and change the tool.

Further, the tool magazine is equipped with a cutter head, the axis of the cutter head is parallel to the Z-axis of the machine tool, the cutter head is equipped with the tool (7) with the handle facing the outside of the tool magazine (6).

Further, the sliding table is arranged on one side of the bed, the tool magazine is arranged on the other side of the bed, the column is arranged on the sliding table, the ram is arranged on the side of the column facing the tool magazine, the swing head is arranged on the ram, the sliding table moves along the Z-axis of the machine tool, the column moves along the Y-axis of the machine tool, and the ram moves along the X-axis of the machine tool.

A method for the above-mentioned bevel swing head interpolation tool changing includes the following steps:

S1: the column moves along the Y-axis so that the swinging head on which the tool is to be loaded moves away from the tool magazine;

S2: the tool magazine rotates, the sliding table moves along the Z-axis, the swing head rotates about the B-axis, and the ram moves along the X-axis, so that the axis of the swing head is coaxial with the tool;

S3: the ram moves along the X-axis towards the tool and the column moves along Y-axis towards the tool, with the ratio of the movement speed of the ram to the movement speed of the column being the tangent of the angle between the axis of the swing head and the Y-axis;

S4: the swing head takes the tool from the tool magazine, and the sliding table moves along the Z axis to detach the tool from the tool magazine.

A method for the above-mentioned bevel swing head interpolation tool changing includes the following steps:

S1: the swing head equipped with the tool rotates about the B-axis, so that the swing head and the X-axis of the machine tool are in the same plane;

S2: the tool magazine rotates, so that the connecting line between the tool holder on the tool magazine and the cutter head axis is parallel to the axis of the swing head;

S3: the sliding table moves along the Z-axis of the machine tool, so that the swing head is located on the side where the tool holder is provided with a mounting opening, and the ram moves along the X-axis of the machine tool, the column moves along the Y-axis of the machine tool, so that the tool on the swing head is aligned with the mounting opening of the tool holder on the tool magazine;

S4: the sliding table moves along the Z axis of the machine tool towards the mounting opening to load the tool onto the tool holder;

S5: the ram moves away from the tool along the X-axis and the column moves away from the tool along the Y-axis, with the ratio of the movement speed of the ram to the movement speed of the column being the tangent value of the angle between the axis of the swing head and the Y-axis, so that the tool is detached from the swing head.

The invention provides a bevel swing head interpolation tool changing mechanism and a method thereof, capable of quick and convenient tool changing through the mutual cooperation of the movement of the linear axes of the machine tool, without complex equipment such as manipulators used, and which is simple in structure, good in stability and easy to maintain.

BRIEF DESCRIPTION OF DRAWINGS

In order to illustrate the embodiments of the present invention or the technical solutions in the prior art more clearly, the following briefly introduces the accompanying drawings that need to be used in the description of the embodiments or the prior art. Obviously, the accompanying drawings in the following description are some embodiments of the present invention, and for a person skilled in the art, other drawings can also be obtained from these accompanying drawings without creative effort.

REFERENCE SIGNS LIST

Figure 1:
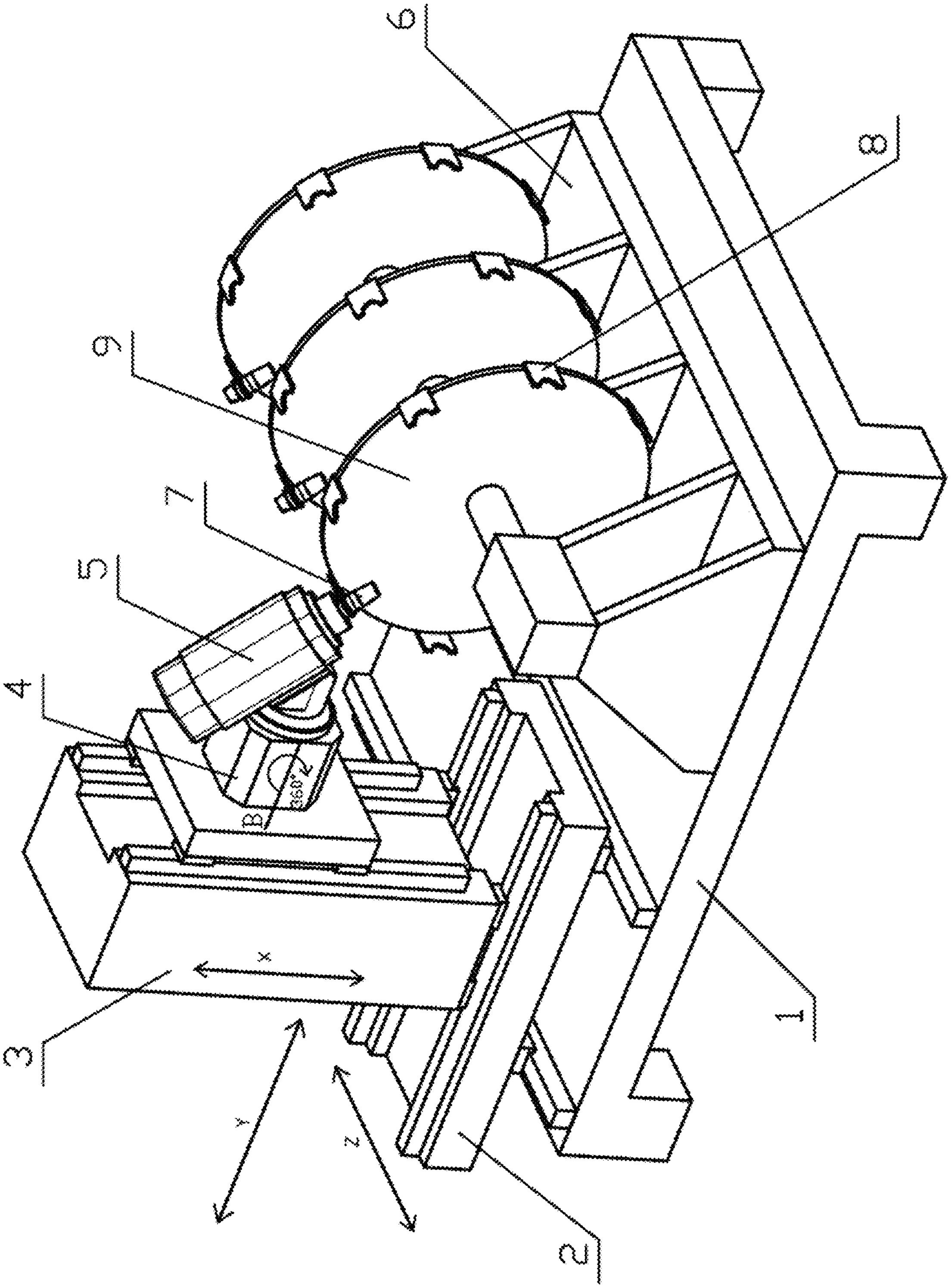
FIG. 1 is a schematic structural diagram of the bevel swing head interpolation tool changing mechanism disclosed in the present invention.

1 bed
2 sliding table
3 column
4 ram
5 swing head
6 tool magazine
7 tool
8 tool holder

DESCRIPTION OF EMBODIMENTS

In order to make the purposes, technical solutions and advantages of the embodiments of the present invention clearer, the technical solutions in the embodiments of the present invention will be clearly and completely described below with reference to the accompanying drawings in the embodiments of the present invention. Obviously, the embodiments to be described are some, but not all, embodiments of the present invention. All other embodiments obtained by persons of ordinary skill in the art based on the embodiments of the present invention without creative efforts shall fall within the protection scope of the present invention.

As shown in FIG. 1, a bevel swing head interpolation tool changing mechanism includes a bed 1, a sliding table 2, a column 3, a ram 4, a swing head 5 and a tool magazine 6, in which the sliding table 2 is arranged on one side of the bed 1, the tool magazine 6 is arranged on the other side of the bed 1, the column 3 is arranged on the sliding table 2, the ram 4 is arranged on the side of the column facing the tool magazine 6, the swing head 5 is arranged on the ram 4, the sliding table 2 moves along the Z-axis of the machine tool, the column 3 moves along the Y-axis of the machine tool, and the ram 4 moves along the X-axis of the machine tool, in which the axis of the ram 4 is the B-axis, the B-axis and the Y-axis are parallel to each other, and the swing head 5 rotates around the B-axis. The slide table 2, the column 3 and the ram 4 enable the swing head 5 to move along the X-axis, Y-axis and Z-axis of the machine tool, the axis of the swing head 5 and the B-axis form an included angle between 30°-60°, and the swing head 5 moves along the axis direction and change the tool.

The axis of the swing head 5 and the Y-axis has an included angle therebetween, which allows that the swing head moves along its own axial direction under the combined action of its movement along the column 3 in the Y-axis direction and its movement in other directions. In this embodiment, the swing head ready for tool change is in the same plane as the X-axis, and its movement along the Y-axis and X-axis helps it to move along its own axial direction. By setting the direction of the tool in the tool magazine in the same direction as the axis of the swing head 5, and moving the swing head to the coaxial position with the tool, the movement of the swing head 5 can complete the interpolation tool change.

Further, the optimal angle between the axis of the swing head 5 and the Y-axis is 45°. When changing the tool, the movement range of the 45° swing head is smaller, which interferes less with the movement of other parts and avoids the interaction therebetween. Since the movement of swing head 5 along its axis direction is accomplished by its movement in both axis directions together, the 45° angle between the axis of swing head 5 and Y-axis can balance the movement of swing head 5 in the two axis directions, so that the movement speed in the two axis directions is equal and the movement distance is the same. This not only makes the bed structure design more balanced, but also makes the tool change more easily controlled.

Further, the tool magazine 6 is provided with a cutter head 9 with the axis thereof parallel to the Z-axis of the machine tool, and the cutter head 9 is equipped with a tool 7 with the handle facing the outside of the tool magazine 6.

The outer edge of the tool magazine 6 is provided with a tool holder 8 on which a mounting opening is provided, and the handle of the tool 7 is provided with a slot through which the tool 7 is mounted onto the mounting opening of the tool holder 8 along the radial direction of the tool magazine 6. The tool 7 fixed by the tool holder 8 can bear radial force. The swing head moves until its axis direction coincides with the tool magazine 6 radially, and then moves along its own axis direction to the tool 7 to grab the tool handle, and then moves toward the side away from the tool holder 8 to make the tool 7 detach from the tool magazine 6.

Figure 2:
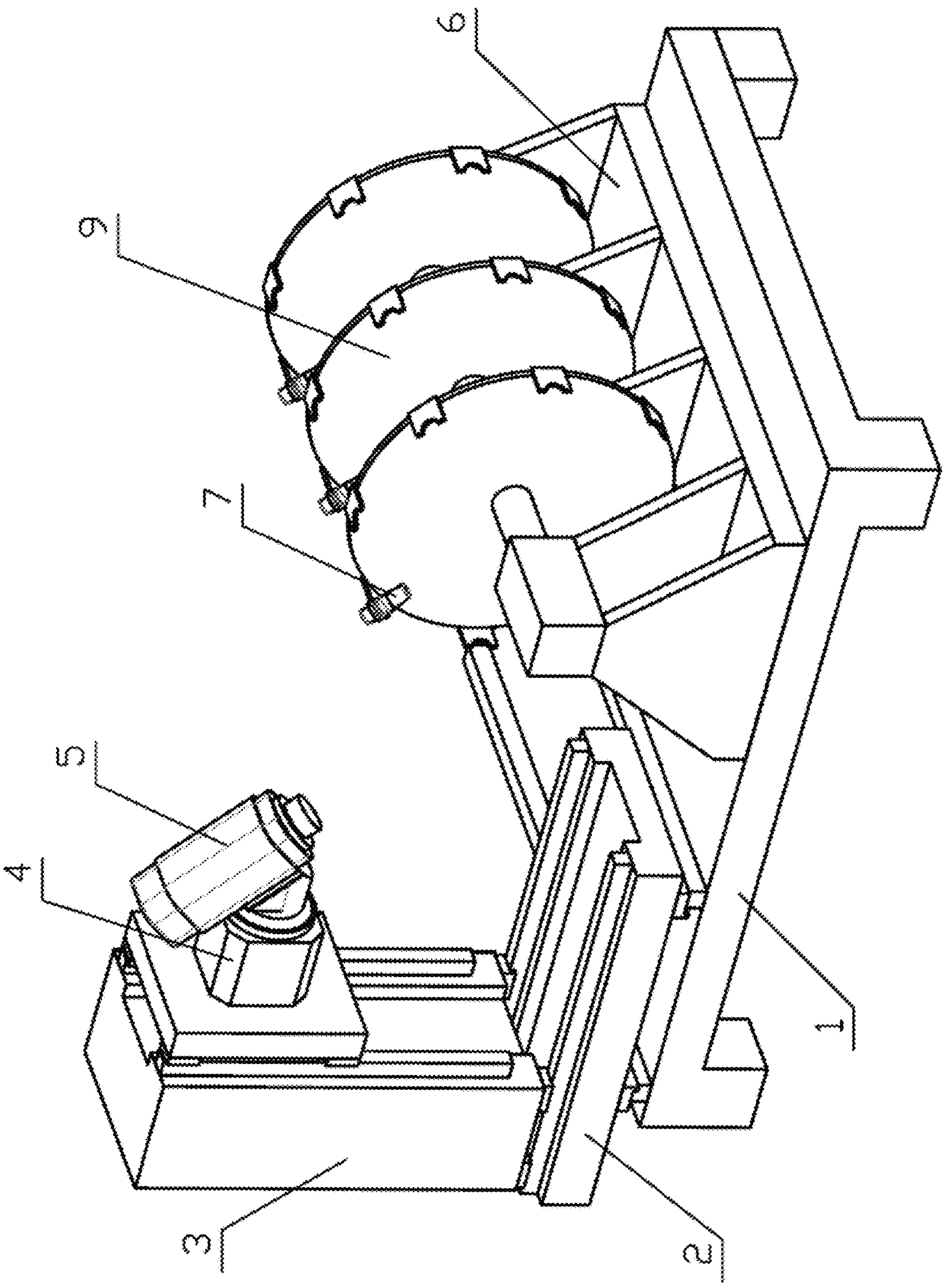
FIG. 2 is a schematic diagram of the tool changing mechanism according to the present invention, in which the swing head with no tool, which is in preparation for taking the tool from the tool magazine, is in the initial position.
Figure 3:
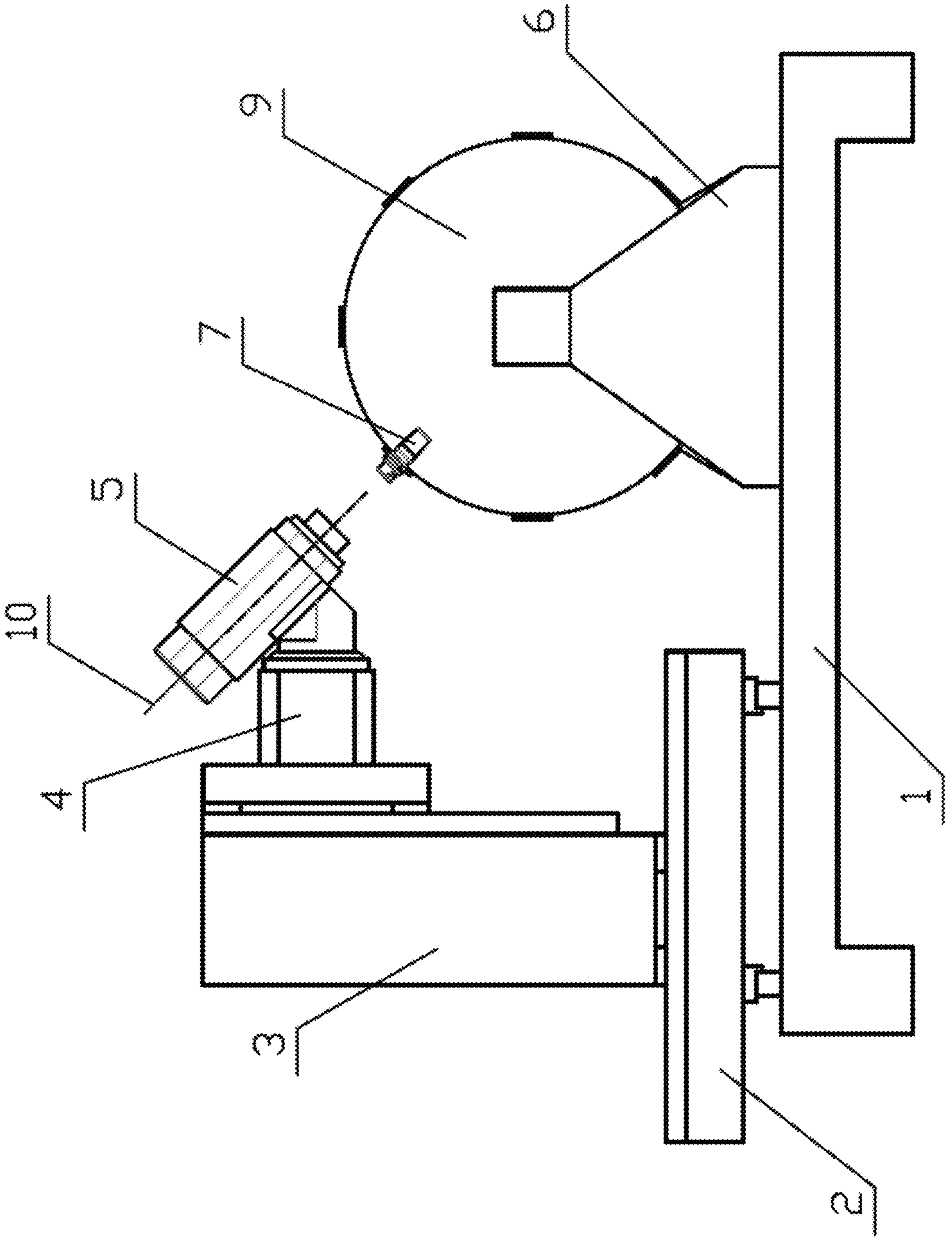
FIG. 3 is a schematic diagram of the tool changing mechanism according to the present invention, in which the swing head is coaxial to the tool.
Figure 4:
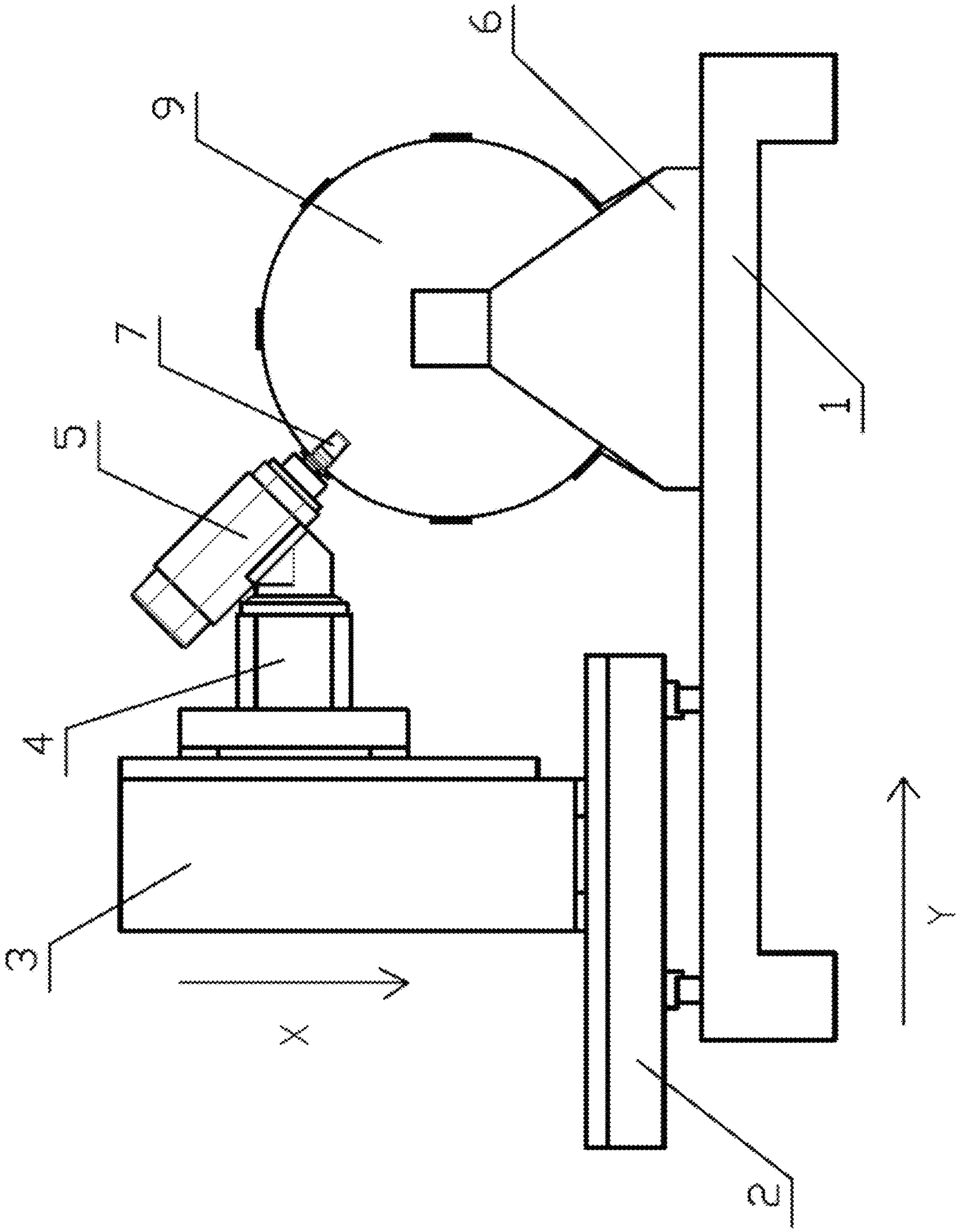
FIG. 4 is a schematic diagram of the swing head according to the present invention, which moves in the direction of its own axis to take the tool.
Figure 5:
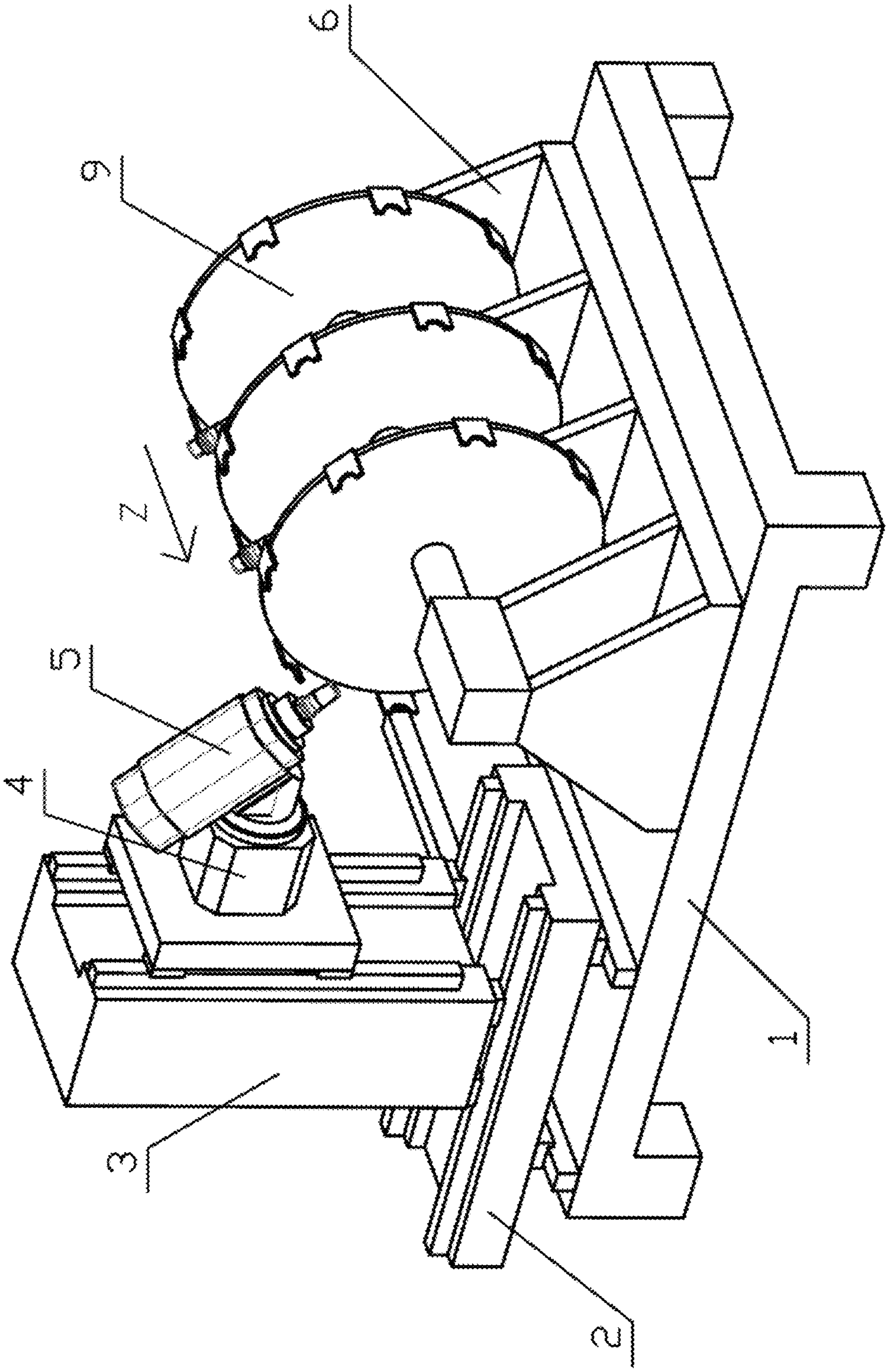
FIG. 5 is a schematic diagram of the tool changing mechanism according to the present invention, in which the tool is being taken away from the tool magazine after being taken.

A bevel swing head interpolation tool changing method for the swing head with no tool includes the following steps:

As shown in FIG. 2, the column moves along the Y-axis to the end away from the tool magazine, to prevent the swing head from colliding the tool magazine when the slide table moves along the Z-axis;

The tool magazine rotates to adjust the angle of the tool, the slide table moves along the Z axis, the swing head rotates about the B-axis, and the ram moves along the X-axis, which makes the axis of the swing head 10 coaxial with the tool, with the B-axis as the axis of the ram; in the embodiment, the end where the swing head is attached to the ram is higher than the end where the swing head is attachable to the tool, and the positions of the swing head and the tool are shown in FIG. 3;

As shown in FIG. 4, the ram moves towards the tool along the X-axis, while the column moves towards the tool along the Y-axis, with the ratio of the movement speed of the ram to the movement speed of the column being the tangent of the angle between the axis of the swing head and the Y-Axis; in the embodiment, the angle between the swing head and the Y-axis is 45°, and the movement speed of the ram is equal to the movement speed of the column;

The swing head takes the tool, as shown in FIG. 5, and the slide table the swing head along the Z-axis to detach the tool from the tool magazine.

Figure 6:
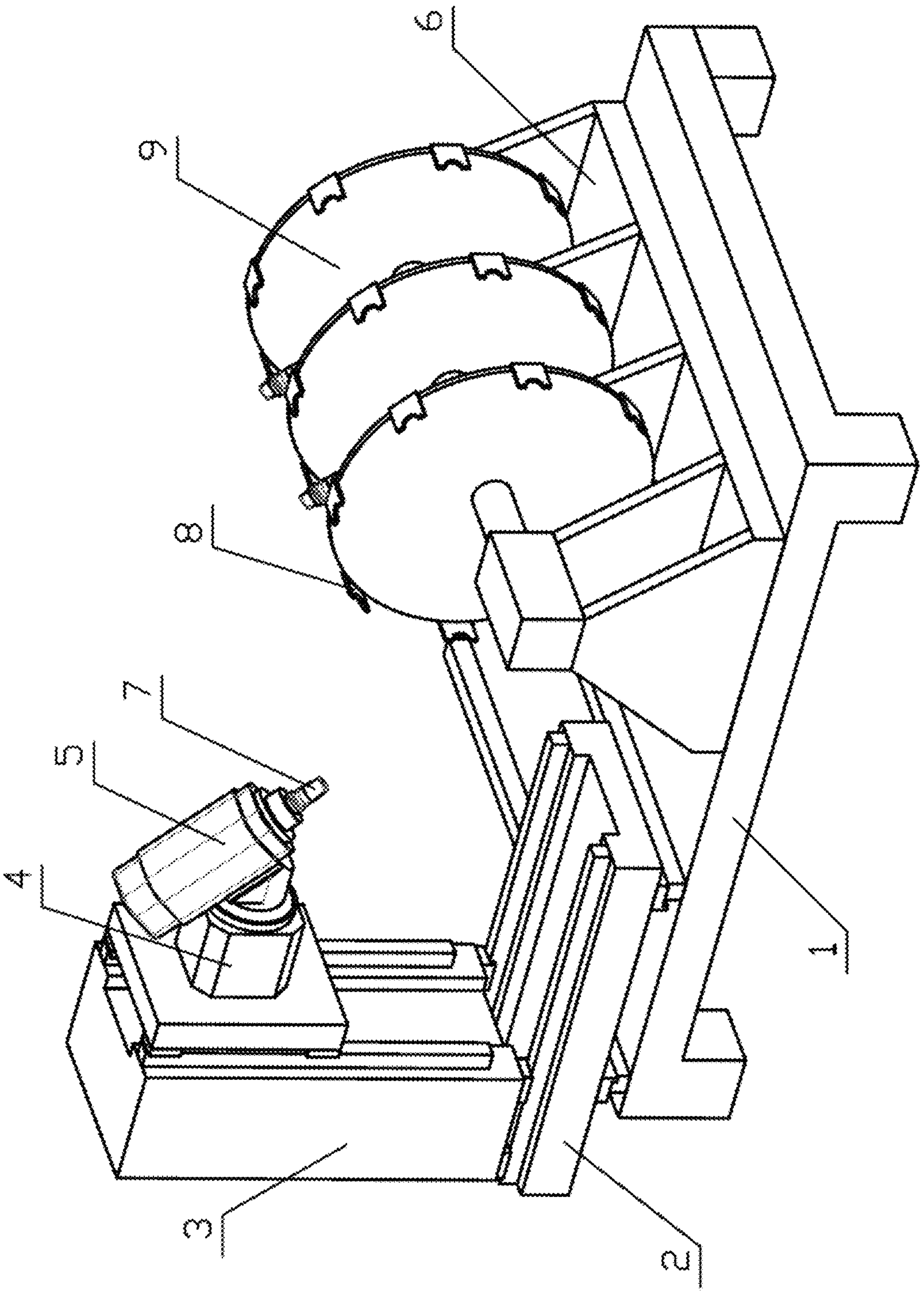
FIG. 6 is a schematic diagram of the tool changing mechanism according to the present invention, in which the swing head with the tool, which is in preparation for sending the tool to the tool magazine, is in the initial position.

A bevel swing head interpolation tool changing method for the swing head with the tool includes the following steps:

As shown in FIG. 6, the swing head rotates about the B-axis so that the swing head and the X-axis of the machine tool are in the same plane; in the embodiment, the end where the swing head is attached to the ram is higher than the end where the swing head is attachable to the tool.

Figure 7:
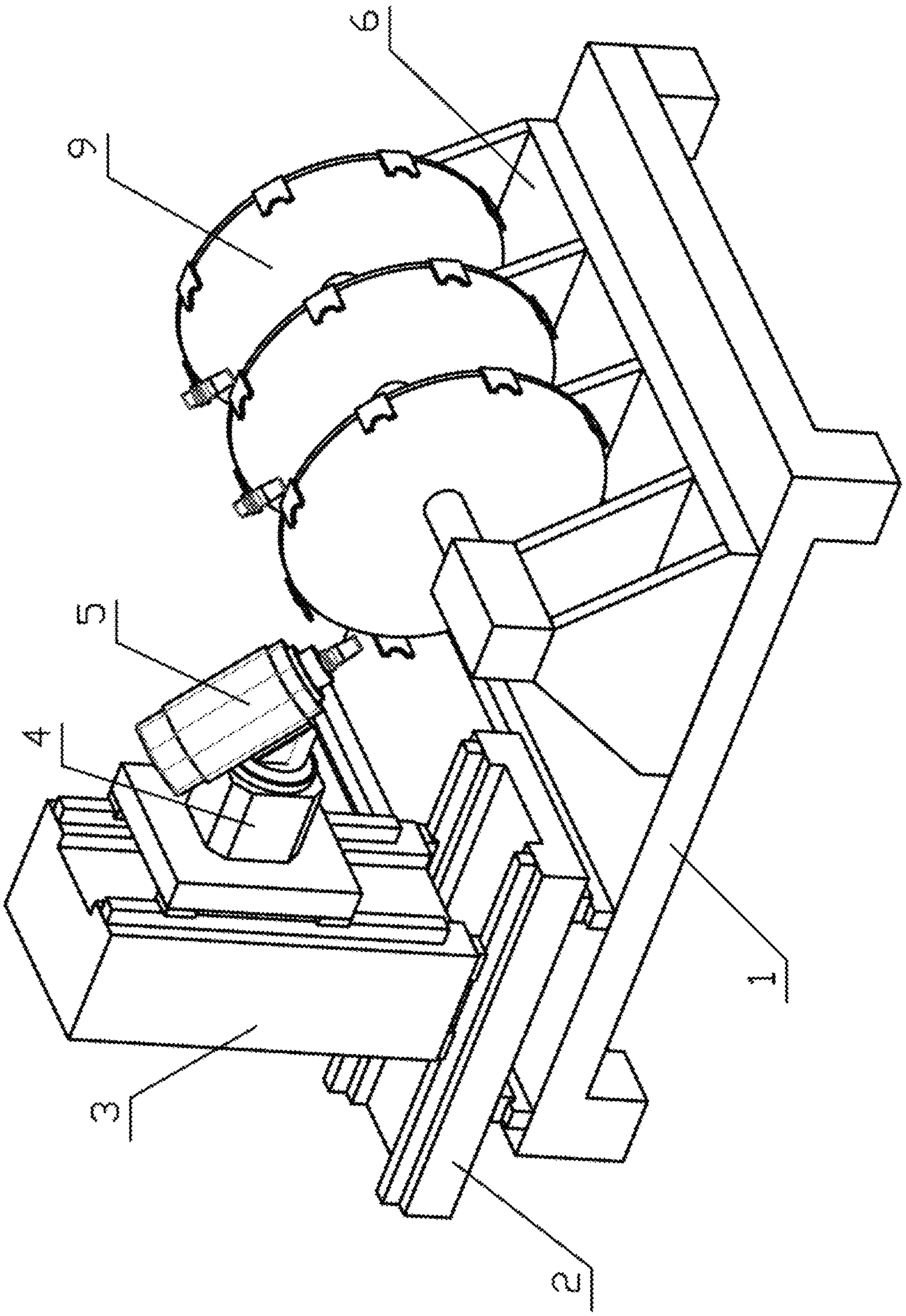
FIG. 7 is a schematic diagram of the tool changing mechanism according to the present invention, in which the tool to be sent is aligned with the tool holder mounting opening.
Figure 8:
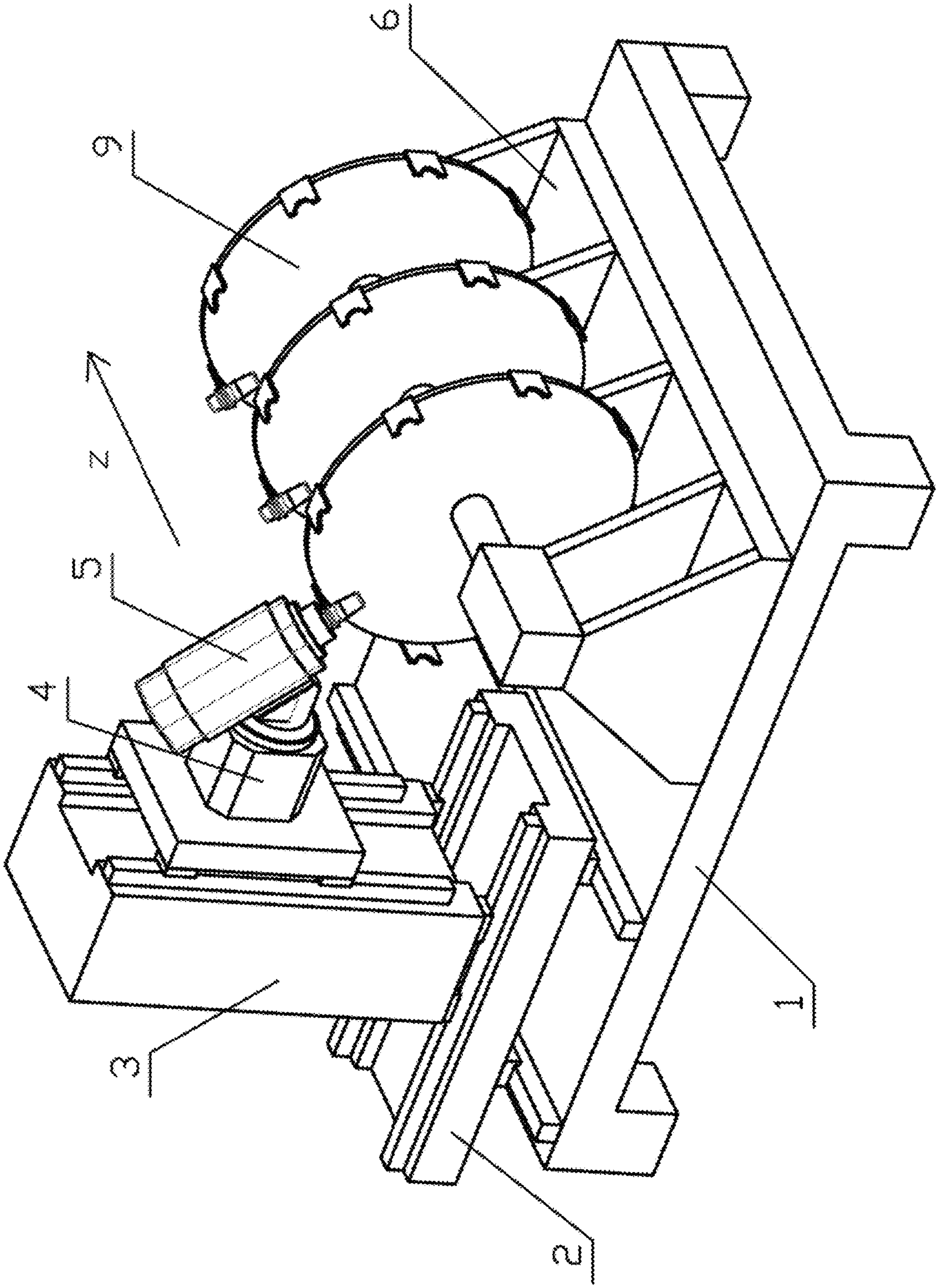
FIG. 8 is a schematic diagram of the tool changing mechanism according to the present invention, in which the tool is being sent into the tool magazine.
Figure 9:
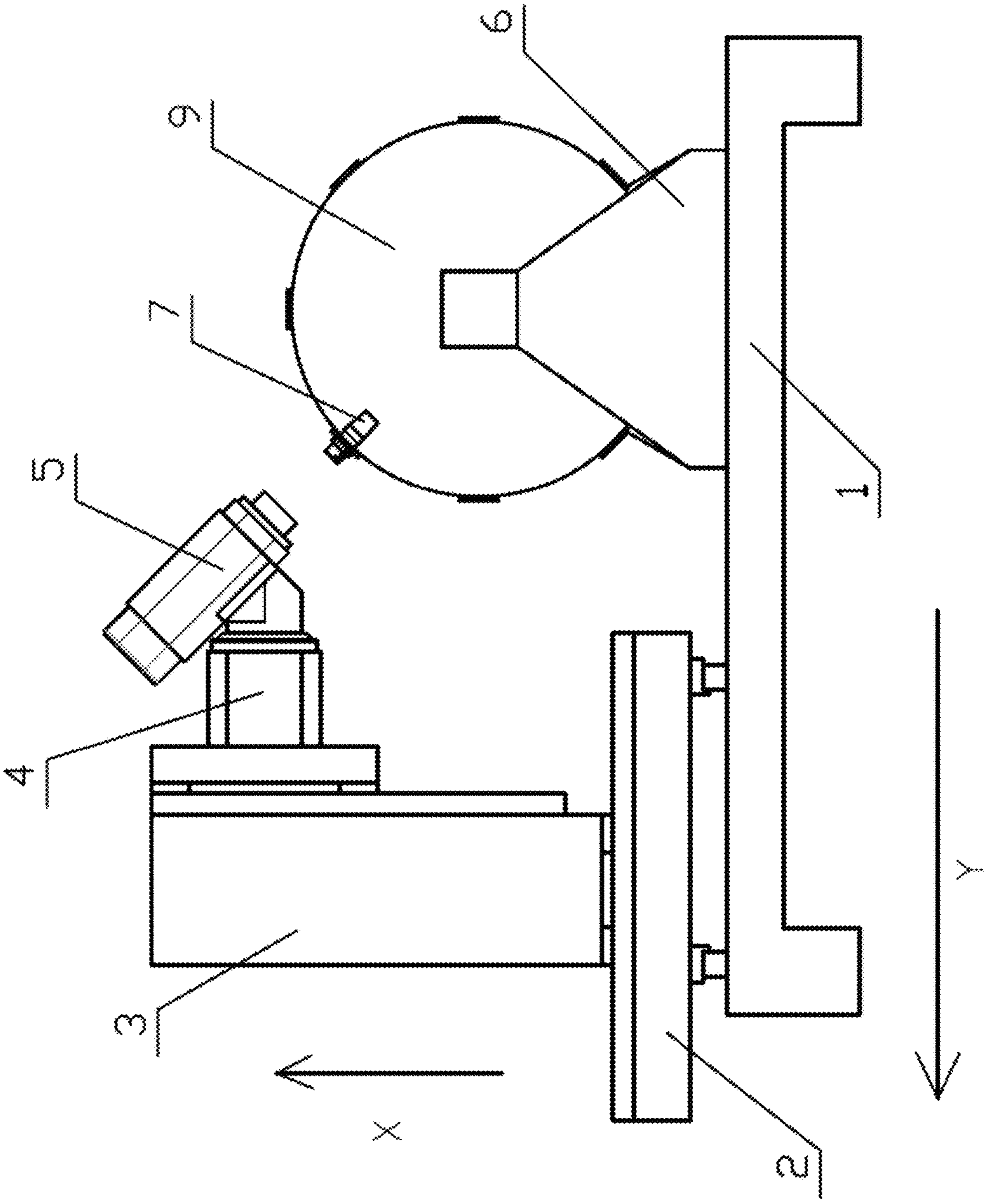
FIG. 9 is a schematic diagram of the swing head being separated from the tool in the present invention.

The tool magazine rotates so that the connecting line between the tool holder and the center of the cutter head on the tool magazine is parallel to the axis of the swing head, and at this time the tool holder has no tool in it and is in the position where the tool is to be mounted;

The sliding table moves along the Z-axis of the machine tool, so that the swing head is on the side of the mounting opening of the tool holder which is ready for tool mounting; the ram moves along the X-axis of the machine tool and the column moves along the Y-axis of the machine tool, so that the tool on the swing head is aligned with the mounting opening of the tool holder of the tool magazine, and the positions of the swing head and the tool magazine are as shown in FIG. 7;

As shown in FIG. 8, the slide table moves along the Z-axis of the machine tool towards the mounting opening to load the tool into the tool holder;

As shown in FIG. 9, the ram moves away from the tool along the X-axis, while the column moves away from the tool along the Y-axis, with the ratio of the movement speed of the ram to the movement speed of the column being the tangent of the angle between the axis of the swing head and the Y-axis, so that the tool is detached from the swing head; in the embodiment, the angle between the swing head and the Y-axis is 45°, and the movement speed of the ram is equal to the movement speed of the column.

Finally, it should be noted that: the above embodiments are only used to illustrate the technical solutions of the present invention, but not to limit them. Although the present invention has been described in detail with reference to the foregoing embodiments, a person skilled in the art should understand that: the technical solutions described in the foregoing embodiments can still be modified, or some or all of the technical features thereof can be equivalently substituted. However, these modifications or substitutions do not make the essence of the corresponding technical solutions deviate from the scope of the technical solutions of the embodiments of the present invention.

The invention claimed is:

1. A bevel swing head interpolation tool changing mechanism, comprising:
- a bed,
- a sliding table,
- a column,
- a ram,
- a swing head, and
- a tool magazine,
- wherein the swing head is configured to move in a direction of at least one of an X-axis, a Y-axis, and a Z-axis,
- wherein a longitudinal axis of the swing head and a B-axis of the ram form an angle that remains between 30°-60°, the tool magazine is equipped with a tool, and the swing head is configured to move in a direction of the longitudinal axis of the swing head so as to attach the swing head to the tool or change the tool that is attached to the swing head,
- wherein the swing head is configured so that when the swing head moves in the direction of the longitudinal axis of the swing head to attach to or change the tool, the ram moves towards the tool in the direction of the X-axis, while the column moves towards the tool in the direction of the Y-axis, with a ratio of a movement speed of the ram in the direction of the X-axis to a movement speed of the column in the direction of the Y-axis being a tangent value of an angle between the longitudinal axis of the swing head and the Y-axis, and
- wherein the B-axis of the ram and the Y-axis extend parallel to each other, and the swing head is configured to rotate about the B-axis.

2. The bevel swing head interpolation tool changing mechanism of claim 1, wherein
- the tool magazine comprises a disk-shaped cutter head, an axis of the cutter head is parallel to the Z-axis, the tool is removably mounted on a periphery of the cutter head, and
- the tool comprises a handle, with the handle of the tool extending outward from the disk-shaped cutter head of the tool magazine, wherein the Z-axis extends perpendicular to the X-axis and to the Y-axis.

3. The bevel swing head interpolation tool changing mechanism of claim 2, further comprising:
- a tool holder for removably mounting the tool, wherein the tool holder is mounted along the periphery of the disk-shaped cutter head of the tool magazine.

4. The bevel swing head interpolation tool changing mechanism of claim 1, wherein
- the sliding table is arranged on a first side of the bed, and the tool magazine is arranged on an opposing second side of the bed, the column is arranged on the sliding table, the ram is arranged on a side of the column, with the ram being between the side of the column and the tool magazine, and
- the swing head is arranged on the ram, the sliding table moves in the direction of the Z-axis, the column moves in the direction of the Y-axis, and the ram moves in the direction of the X-axis.

5. The bevel swing head interpolation tool changing mechanism of claim 1, wherein
- the swing head is configured so that when the swing head moves in the direction of the longitudinal axis of the swing head to attach to or change the tool, the angle between the longitudinal axis of the swing head and the Y-axis is maintained at 45° and the movement speed of the ram is equal to the movement speed of the column.

6. A bevel swing head interpolation tool changing method utilizing the bevel swing head interpolation tool changing mechanism of claim 1, the method comprising the following steps:
- S0: provide the bevel swing head interpolation tool changing mechanism of claim 1;
- S1: move the column along the Y-axis so that the wing swing head moves away from the tool magazine;
- S2: rotate the tool magazine, move the sliding table along the Z-axis, rotate the swing head about the B-axis, and move the ram moves along the X-axis, so that the longitudinal axis of the swing head is coaxial with the tool;
- S3: move the ram along the X-axis towards the tool, and move the column along Y-axis towards the tool, with the ratio of the movement speed of the ram to the movement speed of the column being the tangent of the angle between the longitudinal axis of the swing head and the Y-axis; and
- S4: with the swing head, take the tool from the tool magazine, and move the sliding table along the Z axis to detach the tool from the tool magazine.

7. A bevel swing head interpolation tool changing method utilizing the bevel swing head interpolation tool changing mechanism of claim 1, the method comprising the following steps:
- S0: provide the bevel swing head interpolation tool changing mechanism of claim 1;
- S1: rotate the swing head equipped with the tool about the B-axis, so that the swing head and the X-axis of the machine tool are in a same plane;

S2: rotate the tool magazine, so that a connecting line between a tool holder on the tool magazine and a cutter head axis is parallel to the longitudinal axis of the swing head;

S3: move the sliding table along the Z-axis, so that the swing head is located on a side of the tool magazine where the tool holder is provided with a mounting opening, move the ram along the X-axis, and move the column along the Y-axis, so that the tool on the swing head is aligned with the mounting opening of the tool holder on the tool magazine;

S4: move the sliding table along the Z axis towards the mounting opening so as to load the tool onto the tool holder; and S5: move the ram away from the tool along the X-axis and move the column away from the tool along the Y-axis, with the ratio of the movement speed of the ram to the movement speed of the column being the tangent of the angle between the longitudinal axis of the swing head and the Y-axis, so that the tool is detached from the swing head.

* * * * *